United States Patent
Clarke

(10) Patent No.: US 10,232,378 B2
(45) Date of Patent: Mar. 19, 2019

(54) SEALING MILL LINER BOLT FASTENINGS

(71) Applicant: Ronald C. Clarke, Phoenix, AZ (US)

(72) Inventor: Ronald C. Clarke, Phoenix, AZ (US)

( * ) Notice: Subject to any disclaimer, the term of this patent is extended or adjusted under 35 U.S.C. 154(b) by 0 days.

(21) Appl. No.: 14/700,247

(22) Filed: Apr. 30, 2015

(65) Prior Publication Data

US 2016/0318028 A1    Nov. 3, 2016

(51) Int. Cl.
*B02C 17/22* (2006.01)
*F16B 33/00* (2006.01)

(52) U.S. Cl.
CPC ............ *B02C 17/22* (2013.01); *F16B 33/004* (2013.01)

(58) Field of Classification Search
CPC ...... F16B 43/001; F16B 33/004; F16B 35/06; B02C 17/22
USPC ............ 411/399, 166, 169, 369, 371.1, 542; 241/300
See application file for complete search history.

(56) References Cited

U.S. PATENT DOCUMENTS

| | | | |
|---|---|---|---|
| 1,591,938 A * | 7/1926 | Harrison .................. | B02C 17/22 241/183 |
| 1,784,708 A * | 12/1930 | Pugh ........................ | B60B 3/14 301/35.57 |
| 1,918,107 A | 7/1933 | Joiner | |
| 2,752,814 A * | 7/1956 | Iaia ........................ | F16B 43/001 411/542 |
| 2,884,098 A * | 4/1959 | Hutchison ............. | F16B 19/008 220/681 |
| 2,884,099 A * | 4/1959 | Nenzell .................. | F16B 19/008 29/523 |
| 3,087,370 A * | 4/1963 | Iaia ........................ | F16B 33/004 277/641 |
| 3,241,423 A * | 3/1966 | Davis ..................... | F16B 35/06 411/399 |
| 3,582,007 A * | 6/1971 | Heighberger ........... | B02C 17/22 241/183 |
| 6,241,444 B1 | 6/2001 | Clarke | |
| 6,588,999 B2 * | 7/2003 | Kubler .................. | F16B 33/004 411/258 |
| 7,877,948 B2 * | 2/2011 | Davies ................... | B60R 13/01 411/354 |
| 2003/0230176 A1 | 12/2003 | Fuerle | |
| 2009/0191024 A1 | 7/2009 | Neudorf | |

(Continued)

FOREIGN PATENT DOCUMENTS

CN         202427510 U      9/2012

OTHER PUBLICATIONS

United States International Searching Authority; International Search Report & Written Opinion for PCT/US2015/028763; 7 pages; dated Aug. 5, 2015; Alexandria, VA.

*Primary Examiner* — Flemming Saether
(74) *Attorney, Agent, or Firm* — Kirk Dorius; Dorius Law PC

(57) ABSTRACT

A forged, mill liner bolt (100) has a head (114), a shank (112), tapered load-bearing surfaces (116) and lateral projections (120) defining an undercut surface (117), and a sealing member (118) abutting the undercut surface. A plurality of plastically deformable projections (122) extend from the tapered load-bearing surfaces (116) for spreading a load applied to the bolt. Sealing member (118) provides a partially-elastic joint to maintain clamp loading. Sealing member (118) provides an interior seal within a bore in a mill liner to prevent leaking of and racing by mill slurry liquids.

21 Claims, 8 Drawing Sheets

(56) References Cited

U.S. PATENT DOCUMENTS

2010/0101201 A1    4/2010    Yanke
2011/0121153 A1    5/2011    Magno, Jr. et al.
2011/0173920 A1    7/2011    Yau

* cited by examiner

SEALING MILL LINER BOLT FASTENINGS

FIELD OF INVENTION

This invention generally relates to industrial fasteners, and in particular to mill liner bolts used to secure a disposable metal liner within a drum shell of a rotating ore mill.

BACKGROUND OF THE INVENTION

Rotating mills are used in grinding and self-grinding of various ores. For example, in Semi-Autogenous Grinding (SAG) mills, a rotating drum throws steel balls in a cascading motion to impact and break up larger rocks. This attrition between grinding balls and ore particles causes grinding of finer particles. In self-grinding mills, larger rocks of ore cause impact breakage of other rocks and compressive grinding of finer particles. This grinding action is generally aided by slurries of grinding liquids. The inside of the mill drum is lined with lifting plates to lift the ore, slurry and balls inside the mill. The inside of the mill drum is also lined with a disposable cast metal liner, often with a rubber intermediate liner.

The mill liner is secured to the interior of the drum by an array of mill liner bolts inserted into non-round countersunk through-hole bores in the liner, passing through collocated bores in the rubber liner and drum. The mill liner bolts generally include a threaded shank and a non-round head defining load-bearing chamfered or tapered surfaces roughly corresponding to the taper of the countersunk bores in the mill liner. The mill liner bolts are loaded by tightening of a nut threaded onto the mill liner bolt shank threads extending beyond the exterior of the drum.

In some installations an exterior sealing plate is positioned between the drum exterior and the nut to provide and exterior seal to mitigate escape of slurry liquids through the mounting bores. Persistent flow of grinding fluids through the bores and between the liner, intermediate rubber liner, and/or drum can lead to scouring or racing of metal surfaces. This racing can lead to premature wear and failure of the liner, drum shell, shell ends, and other affected structures.

Typically, the bolt holes in the liners are cast approximately ⅛" larger, all around the bolt head, for a standard 1½" liner bolt. Point loads can be created by clearance and manufacturing tolerances or debris between the liner, which is cast, and the radiused, tapered, load bearing area of the mill liner bolt head, which is forged. Poor load contact can cause early embedment with subsequent loss of bolt clamp load. In many instances, the bolts may not establish enough surface area contact to remain tight and need to be periodically tightened through the life of the liners. Often, loose bolts fatigue and break with expensive consequences if the liners become detached. Running a mill with loose bolts can also cause bolt holes in the mill drum shell to become enlarged, which encourages further loosening and leaking problems eventually leading to expensive repair or replacement of the mill drum shell.

Point loads from debris or misalignment of load-bearing surfaces and loosening of the mill liner bolts can also cause premature failure of the liner, e.g., due to partial pull-through of the mill liner bolt head through the cast liner. In particular, loading of the mill liner bolt, compression of the intermediate rubber liner, and end compaction of the mill liner bolt head by ore or mill balls can generate significant stresses around the bore in the mill liner. Premature failure of the liner and mill liner bolts can lead to significant costly downtime as bolts are retightened or as the bolts and liner are replaced.

Accordingly, improvements are sought in mitigating racing, point loading and pull-through in mill liner installations.

SUMMARY OF THE INVENTION

While the way that the present invention addresses the disadvantages of the prior art will be discussed in greater detail below, in general, the present invention provides an interior mill liner fastening seal while shifting the contact area of the load-bearing bolt head further up the tapered sidewalls of a mill liner bore. The interior seal serves to prevent racing of surfaces by liquids. Compression of the seal material further serves to provide a partially elastic joint, without creating a gasketed joint, improving maintenance of clamp loading during end compaction and prolonged operation.

One aspect of the invention features, in some embodiments, a mill liner bolt including a bolt shank; an oblong head extending from the bolt shank and defining tapered load-bearing surfaces extending towards the shank at opposite ends of the oblong head and further defining respective undercut surfaces extending between the tapered load-bearing surfaces and the bolt shank; and a compressible sealing member abutting the undercut surface.

In some embodiments, the mill liner bolt includes lateral projections disposed on opposite sides of the oblong head between the tapered load bearing surfaces and substantially aligned with the undercut surfaces to support the compressible sealing member during loading.

In some embodiments, the oblong head includes tapered load-bearing surfaces and lateral projections is formed by forging.

In some embodiments, the compressible sealing member is configured and positioned to reduce local contact loading and thereby reduce risk of break-out proximate a central through-hole portion of a tapered bore in a mill liner.

In some embodiments, the compressible sealing member is configured to provide a seal between the mill liner bolt and the bore in the mill liner without forming a gasketed joint.

In some embodiments, the compressible sealing member is configured to absorb impacts to and vibration of the mill liner bolt during compaction of the mill liner bolt by a mill ball or ore during mill operation.

In some embodiments, the compressible sealing member is positioned to sealingly engage a mill liner bore surface substantially complementary to the tapered load-bearing surfaces.

In some embodiments, the mill liner bolt includes a plurality of projections extending from the tapered load-bearing surfaces and configured to deform during loading in contact with a mill liner.

In some embodiments, the sealing member is compressible during loading so as to be at least partially extruded into a void between the bolt shank and a central through-hole portion of a bore in the mill liner.

In some embodiments, the sealing member is configured to reduce racing of a mill liner by substantially preventing flow of slurry through a bore in the mill liner.

In some embodiments, the compressible sealing member is configured with sufficient thickness and durometer to form a partially elastic joint such that compression of the sealing member resists impact loosening of the mill liner bolt from compaction of the mill liner bolt head by mill balls or ore during mill operation.

In some embodiments, a portion of the sealing member defines a substantial continuation of a taper profile of the tapered load-bearing surface.

In some embodiments, the sealing member comprises an elastomeric O-ring positioned over the mill liner bolt shank and abutting the undercut surface.

In some embodiments, the sealing member is configured to provide an interior seal against escape of slurry from within the mill and to absorb impacts to and vibration of the mill liner bolt during mill operation.

Another aspect of the invention features a mill liner bolt including a bolt shank, a substantially oblong bolt head defining opposed tapered load-bearing surfaces and further defining an undercut; and a compressible sealing member disposed about the bolt shank abutting the undercut.

In some embodiments, the bolt head further comprises lateral projections defining at least a portion of the undercut.

In some embodiments, the mill liner bolt includes deformable ridges extending from the tapered load-bearing surfaces.

In some embodiments, the sealing member is positioned to provide a high-pressure seal between the bolt head and a complementary mill liner surface to substantially prevent racing of fastening surfaces or the mill liner.

Another aspect of the invention features a method of forming a fastening including a mill liner. The method includes providing a mill liner bolt having a compressible sealing member disposed about a shank of the mill liner bolt and abutting an undercut defined by a head of the mill liner bolt, the head further defining tapered load-bearing surfaces; installing the mill liner bolt within a bore defined in a mill liner, the bore defining a central through-hole portion and a tapered sidewall portion; and loading the mill liner bolt to compress the deformable sealing member to form a partially elastic joint and a seal between the tapered sidewall portion of the bore and the mill liner bolt.

In some applications, the method includes loading the mill liner bolt to deform projections extending from the head of the mill liner bolt in contact with the tapered portion of the bore in the mill liner.

In some applications, the compressible sealing member is positioned to sealingly contact a thinner portion of the tapered sidewall portion of the bore that is more prone to breakout proximate the through-hole portion of the bore, while the tapered load-bearing surfaces of the mill liner bolt head are positioned in contact with a thicker portion of the tapered sidewall portion of the bore to thereby reduce breakout adjacent the through-hole portion of the bore.

In some applications, restorative forces of the sealing member during compression resist impact loosening of the mill liner bolt during compaction of the mill liner bolt head during mill operation.

In some applications, the sealing member is configured to reduce racing of the mill liner by substantially preventing flow of slurry through the bore in the mill liner.

Accordingly, the present invention provides improved mill liner fastening and sealing.

BRIEF DESCRIPTION OF THE DRAWINGS

A more complete understanding of the present invention may be derived by referring to the detailed description and claims when considered in connection with the Figures, wherein like reference numerals refer to similar elements throughout the Figures.

DETAILED DESCRIPTION

The following description is of exemplary embodiments of the invention only, and is not intended to limit the scope, applicability or configuration of the invention. Rather, the following description is intended to provide a convenient illustration for implementing various embodiments of the invention. As will become apparent, various changes may be made in the function and arrangement of the elements described in these embodiments without departing from the scope of the invention as set forth herein. It should be appreciated that the description herein may be adapted to be employed with alternatively configured devices having different shapes, components, compositions and the like and still fall within the scope of the present invention. Thus, the detailed description herein is presented for purposes of illustration only and not of limitation.

Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

Figure 1:
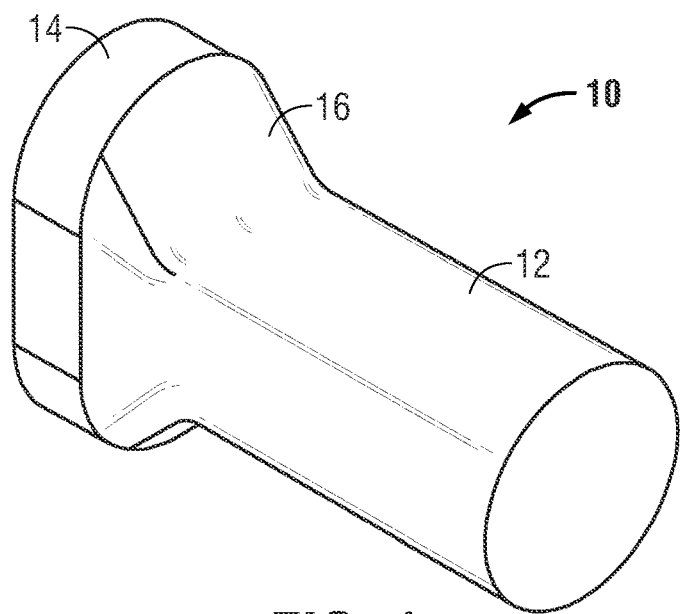
FIG. 1 is a perspective view of a prior art mill liner bolt.
Figure 2:
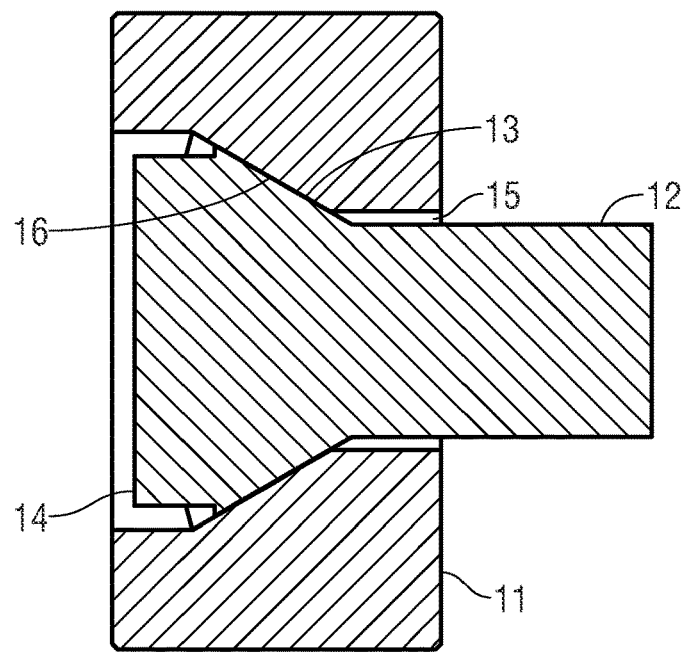
FIG. 2 is a side view of the prior art mill liner bolt of FIG. 1 showing tapered ends of the bolt head.
Figure 3:
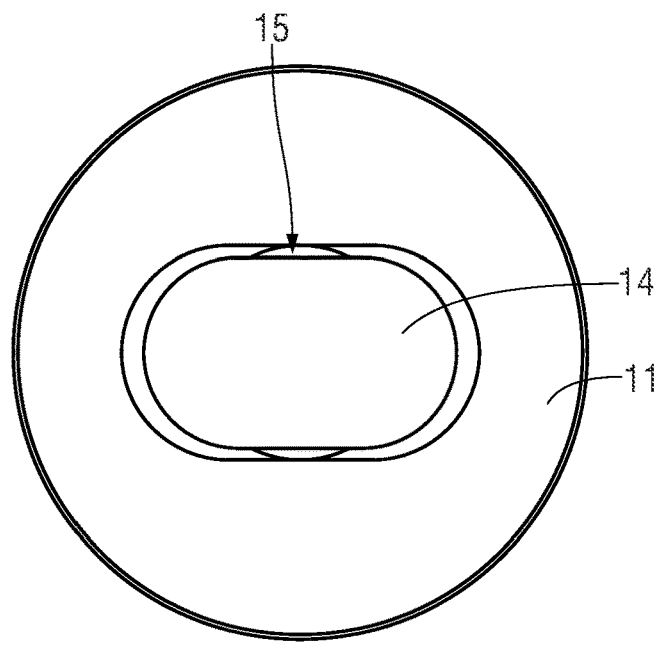
FIG. 3 is a top view of the prior art mill liner bolt of FIG. 1 installed in a countersunk bore in a mill liner.
Figure 4:
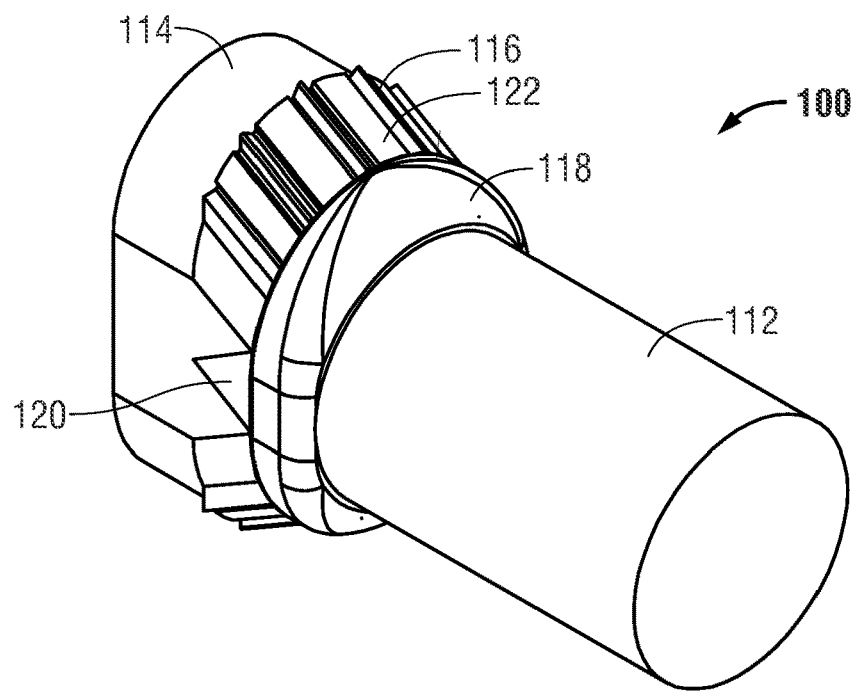
FIG. 4 is a perspective view of a mill liner bolt having a sealing member disposed about the bolt shank abutting an undercut of a chamfered head of the mill liner bolt.
Figure 5:
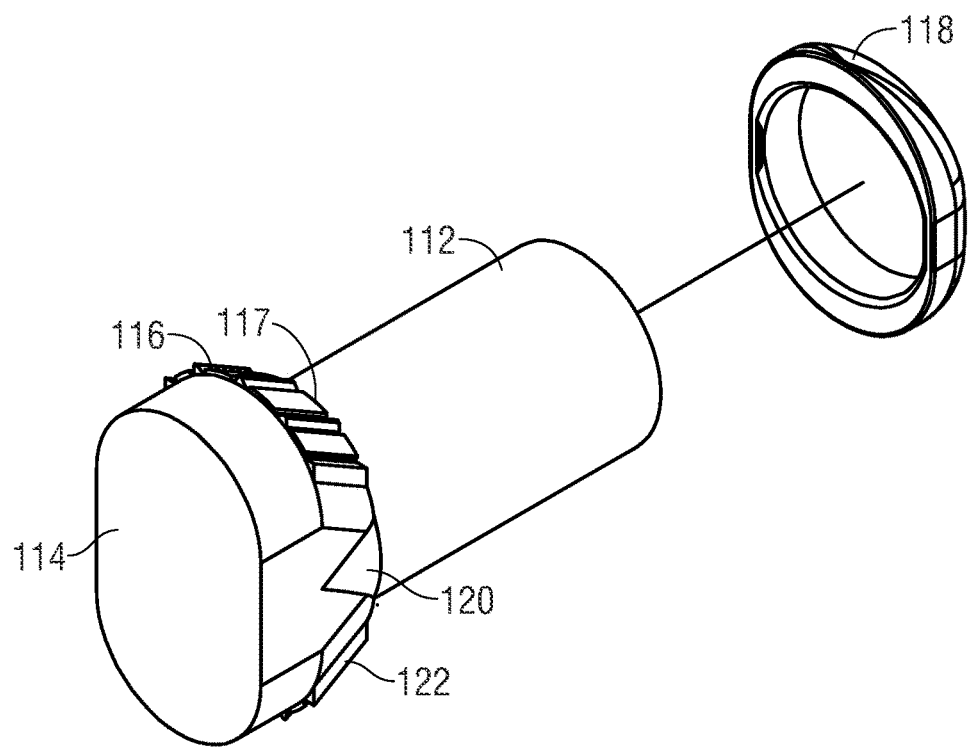
FIG. 5 is another perspective view of the mill liner bolt of FIG. 4 and separate sealing member.
Figure 6:
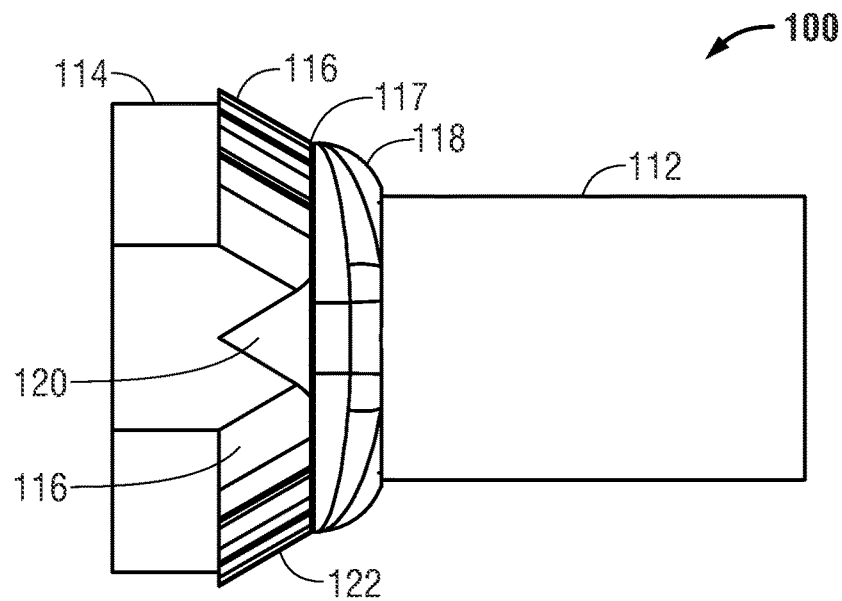
FIG. 6 is a side view of the mill liner bolt of FIG. 4.
Figure 7:
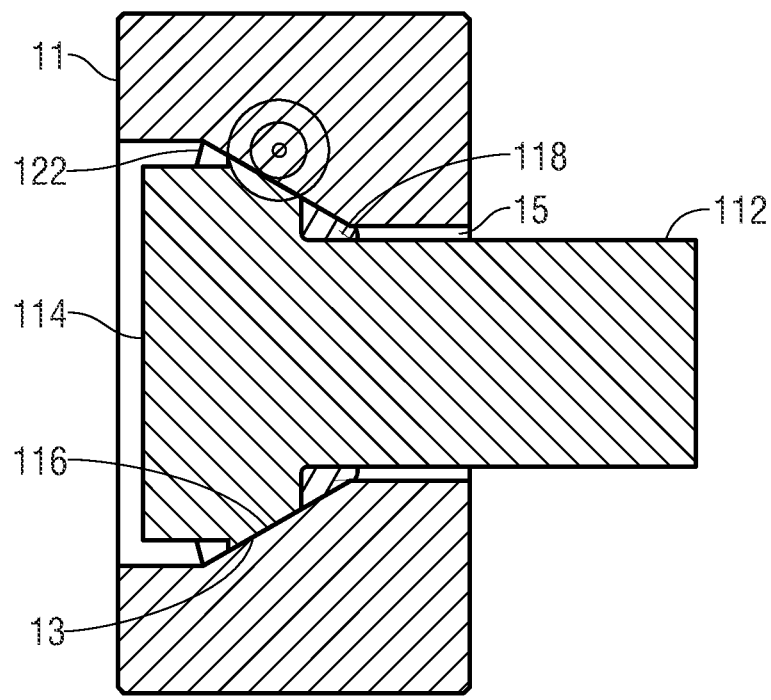
FIG. 7 is a side cross-sectional view of the mill liner bolt of FIG. 4 installed in a countersunk bore defined in a mill liner.
Figure 8:
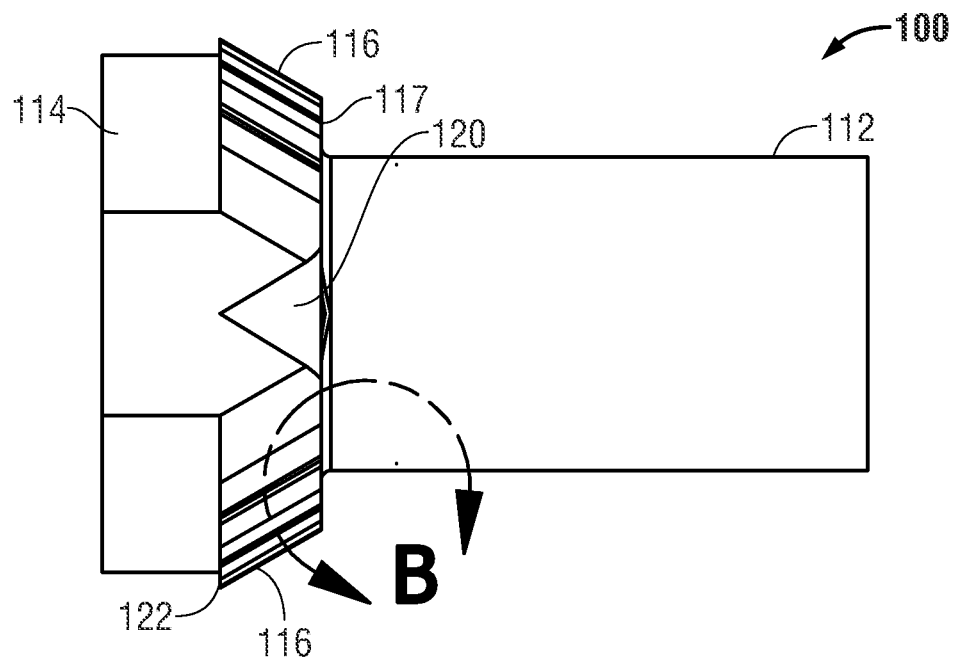
FIG. 8 is a side view of the mill liner bolt of FIG. 4.
Figure 9:
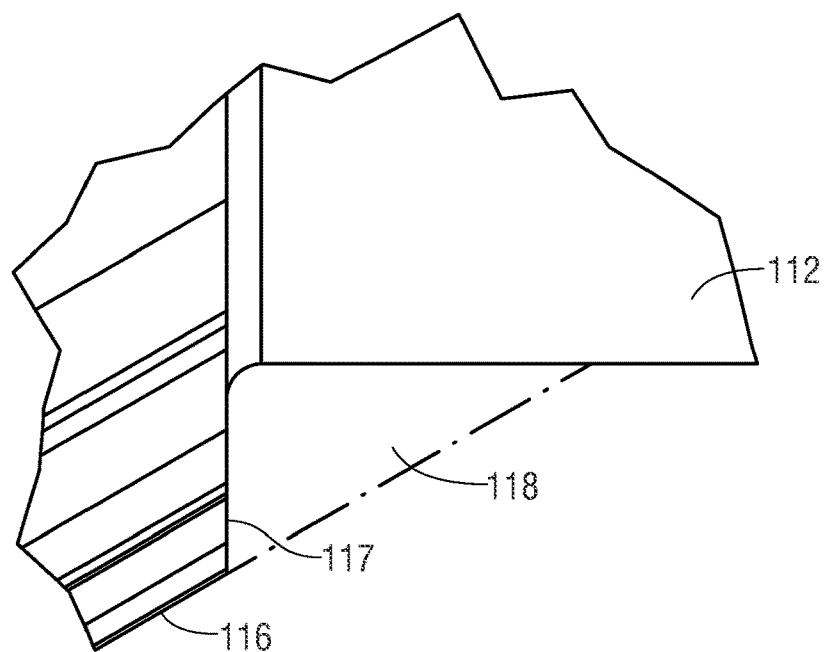
FIG. 9 is a detailed side view of the undercut surface defined by the head of the mill liner bolt of FIG. 8.
Figure 10:
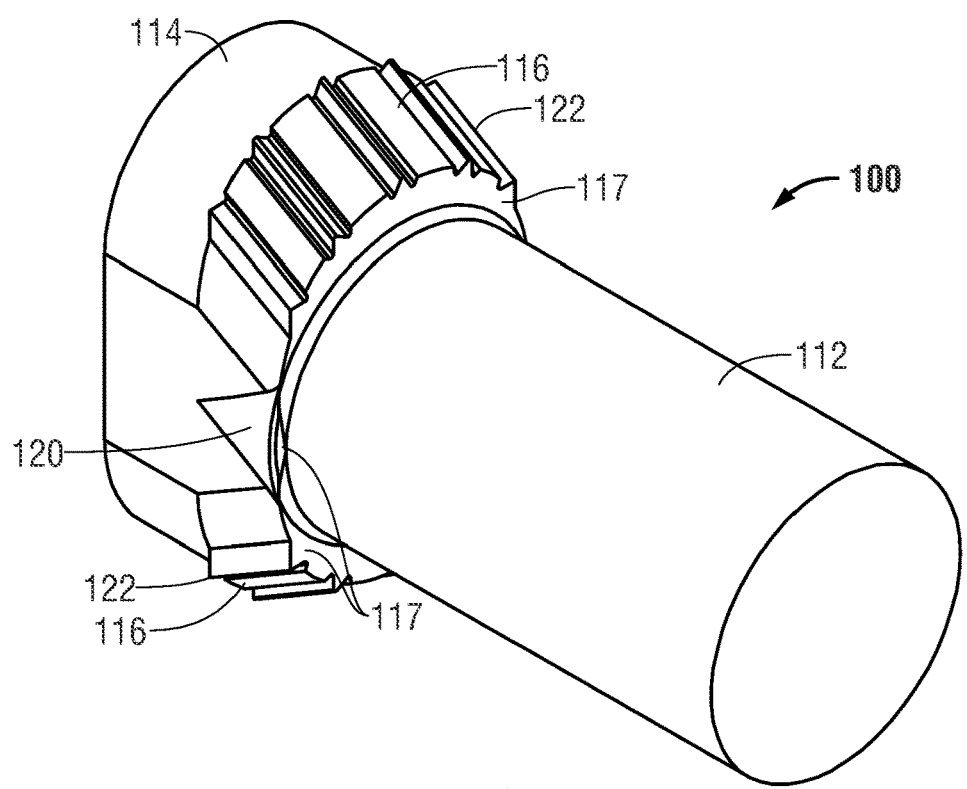
FIG. 10 is another perspective view of the mill liner bolt of FIG. 4 showing the undercut surface and lateral projections defined by the bolt head.
Figure 11:
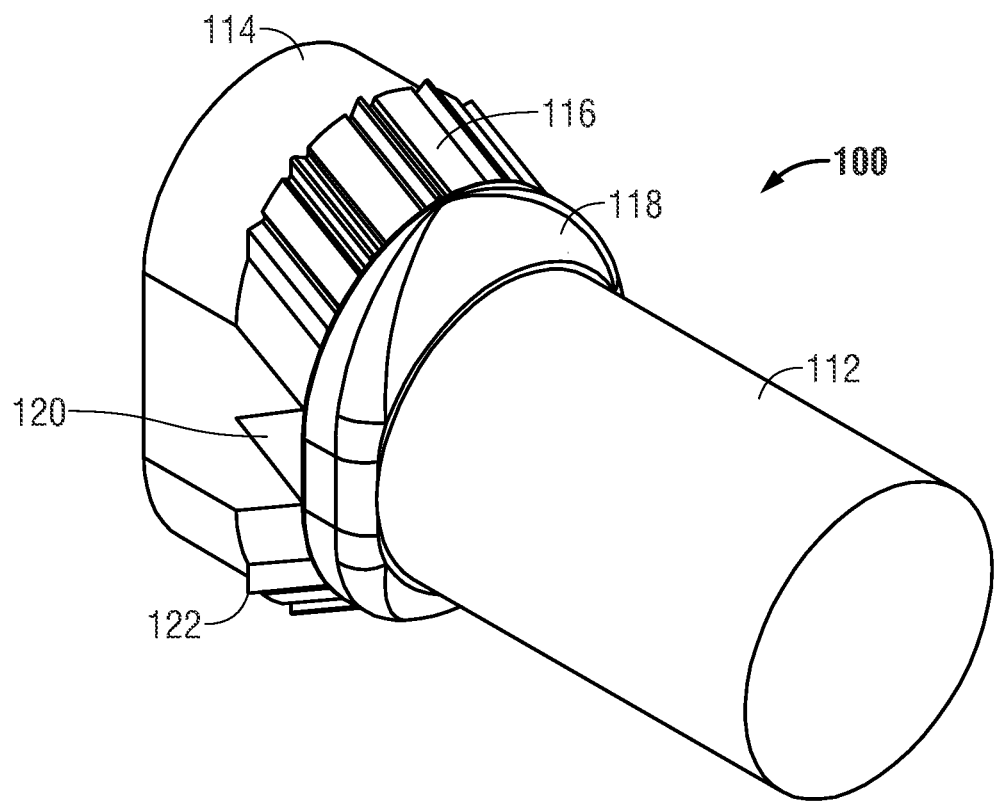
FIG. 11 is a perspective view of the mill liner bolt of FIG. 10 showing the sealing member supported by the undercut surface and projections defined by the bolt head.

With reference to FIGS. 1-3, a prior art mill liner bolt 10 includes a shank 12, head 14 and tapered load-bearing surfaces 16. FIG. 2 illustrates bolt 10 installed within a bore defined in mill liner 11. The bore defines tapered sidewalls 13 and central though-hole 15. In prior installations, tapered load-bearing surfaces 16 engage tapered sidewalls 13 leading up to through-hole 15. This tapered interface causes concentration of significant loading forces at the weaker lower portion of the tapered bore defined in the mill liner 11. This location of loading can lead to pull-through of mill liner bolt 10 through the thinner portion of mill liner 11 adjacent through-hole 15. Prior installations can also be prone to loosening of mill liner bolt 10 during compaction of ore and mill balls against the head of the mill liner bolt.

With reference now to FIGS. 4-11, an improved mill liner bolt 100, according to one embodiment, includes a shank 112, head 114, tapered load-bearing surfaces 116, and lateral projections 120 from head 114. An undercut surface(s) 117 is defined by head 114 between tapered load-bearing surfaces 116 and shank 112. An elastomeric sealing member 118 is positioned adjacent undercut surfaces 117.

Sealing member 118 occupies a void between undercut surface 117 and shank 113 to engage a lower portion of tapered sidewalls 13 adjacent through-hole 15 in mill liner 11. This effectively shifts the loading forces to a higher portion of sidewalls 13 to be supported by a greater thickness of mill liner 11, greatly reducing the risk of pull-through damage. Sealing member 118 also serves to maintain compressive forces between the mill liner bolt 100 to maintain a partially elastic joint during end compaction during mill operation.

Shifting the loading higher to a thicker cross-sectional area of mill liner 11 along the tapered interface between respective tapered surfaces of mill liner 11 and mill liner bolt 100 provides better distribution of the liner hold down or bolt clamping force. Conversely, sealing member 118 reduces the bolt clamping force applied to the weaker lower section of mill liner 11 adjacent through-hole 15, thus minimizing pull-through or break-out damage in this thinner material.

Sealing member 118 serves to form a seal between mill liner bolt 100 and mill liner 11. During loading of mill liner bolt 100, sealing member 118 is extruded into the gaps between mill liner bolt 100 and mill liner 11. This sealing prevents flow of abrasive milling slurry fluids which prevents racing of mill liner 11 and the mill shell. This also prevents leakage of milling fluids from the mill. In some embodiments, an interior seal formed by sealing member 118 prevents flow or migration of fluids through the bore defined in mill liner 11. In some embodiments, additional top seals on the mill shell exterior serve to provide exterior seals to further mitigate leakage of liquids from the mill shell.

Figure 15A:
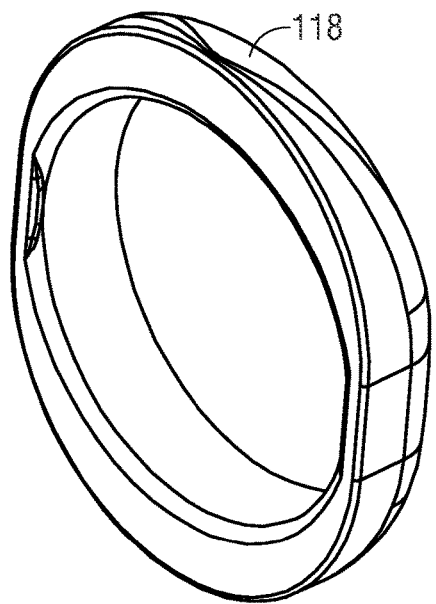
FIG. 15A is a perspective view of a sealing member.
Figure 15B:
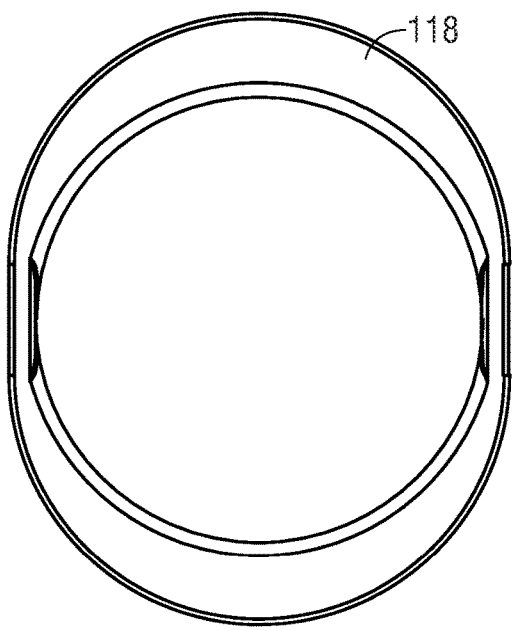
FIG. 15B is a bottom view of a sealing member.
Figure 15C:
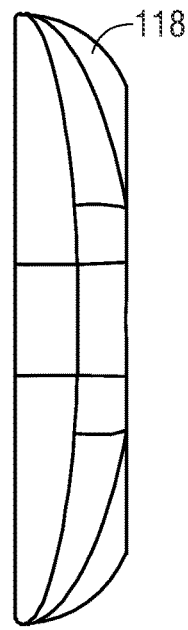
FIG. 15C is a side view of a sealing member.

With reference to FIGS. 15A-C, sealing member 18, in some embodiments, defines tapered surfaces, e.g., to aid in centering or other positioning of the mill liner bolt head. Sealing member 18 can comprise rubber, elastomeric material or other material of suitable durometer to form a seal in a high-loading installation. The composition of sealing member 118 can be selected based on any number of operational factors, e.g., different compositions may be used for more basic or more acidic slurries.

The resilience of sealing member 118 further serves to provide a partly-elastic joint to resist loosening of mill liner bolt 100. A portion of the tightening energy absorbed by sealing member 118, e.g., EPDM elastic mass, will act as a cushion to resist bolt loosening under impact and other dynamic loads.

Figure 12:
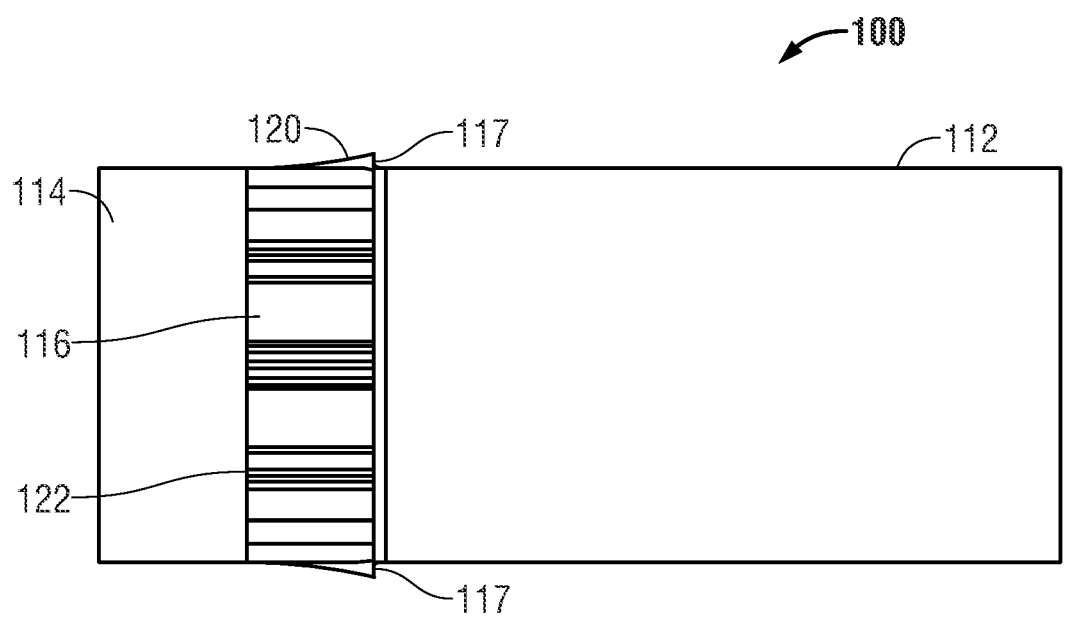
FIG. 12 is a rotated side view of the mill liner bolt of FIG. 4 showing the lateral projections extending from the sides of the bolt head.
Figure 13:
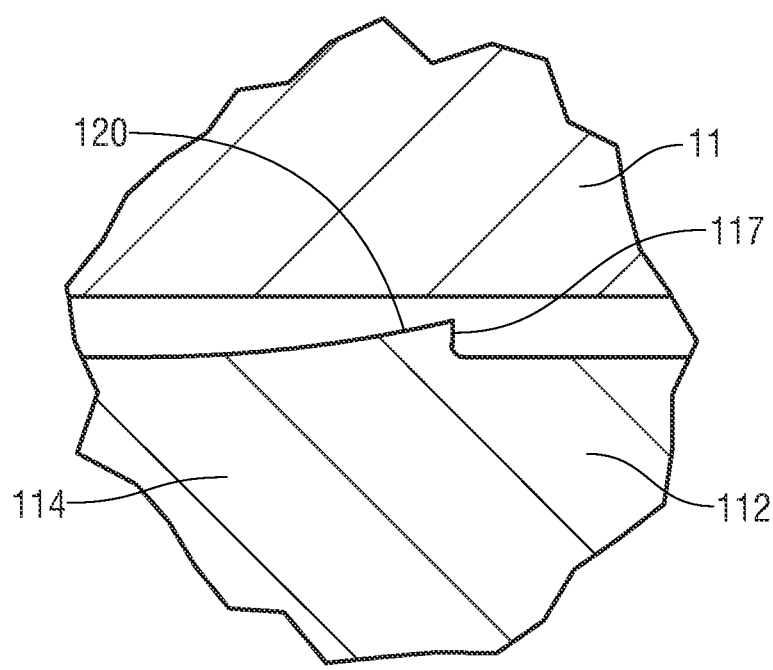
FIG. 13 is a close-up of the lateral projections defined on the bolt head to support the sealing member installed in the countersunk bore defined in the mill liner.
Figure 14:
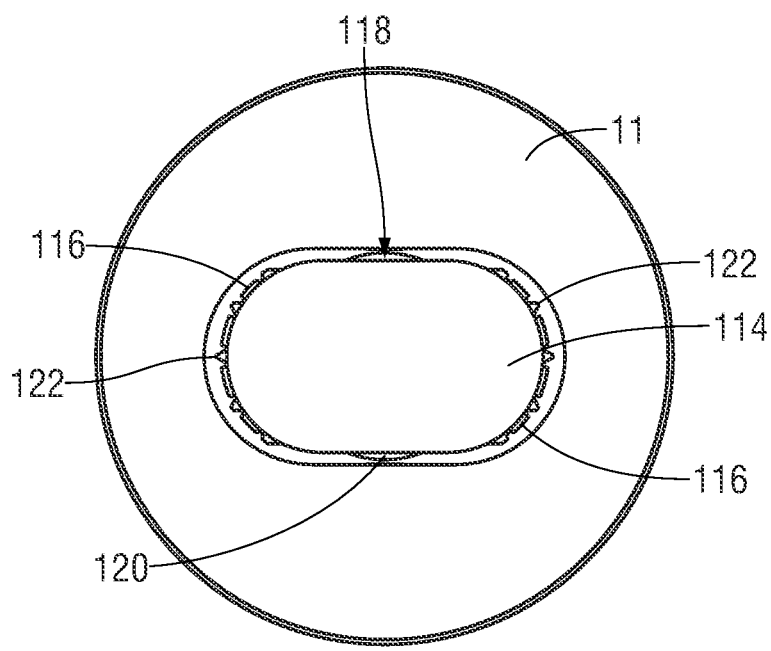
FIG. 14 is an end view of the mill liner bolt head installed in the countersunk bore defined in the mill liner with the sealing member filling a clearance gap defined between the mill liner bolt head and the mill liner.

With reference now to FIGS. 12-13, head 114 of mill linter bolt 100 defines lateral projections 120 which serve to define undercut surfaces to support sealing member 118. Lateral projections 120 need not bear significant loading to compress sealing member 118 to seal a gap between shank 112 and through-hole 15 defined in mill liner 11. Lateral projections 120 can be formed during forging of head 114. In some embodiments, lateral projections 120 form the widest features of head 114 transverse to the greater length of the oblong head 114.

Head 114 further defines deformable projections 122 along tapered load-bearing surfaces 116. Deformable projections 122 serve to reduce point loading at the tapered interface by deforming to more evenly spread the loading across the harder surface of mill liner 11. Deformable projections 122 accommodate the various clearance and manufacturing tolerances between mill liner 11, which is cast, and the radiused, tapered, load-bearing surfaces 116 of mill liner bolt 100, which is forged. Deformable projections 122 thus increase bearing surface contact relative to point loading between mill liner bores and conventional smooth-faced tapered load-bearing surfaces of mill liner bolts. Otherwise, poor load area contact could cause early embedment with subsequent loss of bolt clamp load soon after assembly. Loss of bolt clamp load could lead to expensive downtime as the bolts are periodically tightened or replaced through the life of the liners.

These ridges or deformable projections 122 are constructed so that they deform under load when tightened against the harder steel liner 11. As the bolt 100 is tightened, plastic deformation of deformable projections 122 provides additional radial and axial contact, until full clamp load is reached, at which time this load is spread over a larger and more uniform surface.

In some embodiments, a method of sealing a mill liner includes positioning sealing member 118 over shank 112 of mill liner bolt 100 and installing mill liner bolt 100 within a bore defined in mill liner 11 to form an interior seal against escape of milling liquids. While top seals on the exterior of mill shells are often used to mitigate leaking around mill liner bolts, applicants have conceived a new method of interior sealing of such mill installations.

In some embodiments, installation of mill liner bolt 100 includes elastic deformation of sealing member 118 to fill gaps or voids between mill liner bolt 100 and mill 11, e.g., between shank 112 and through-hole 15. Sealing member 118 abuts an undercut surface 117 defined by head 114 of mill liner bolt 100. Portions of undercut surface 117 extend between shank 112 and tapered load-bearing surfaces 116. Portions of undercut surface 117 extend between shank 112 and lateral projections 120 on head 114.

Loading of mill liner bolt 100 during installation initially forms an elastic joint as sealing member 118 is compressed. Even after full loading of mill liner bolt 100 to form a hard metal-to-metal joint, sealing member 118 provides a partially elastic joint to resist loosening during vibration, compaction, and other cyclical loading during mill operation. Thus, during the operation of the mill, sealing member 118 serves to prevent leaking, racing, loosening and fatigue of the joint. In contrast, introducing rubber or other elastic material directly between the load-bearing joint surfaces would create a gasketed joint that would not hold bolt preloads adequately, i.e., without a hard metal-to-metal joint.

In one example of installation of one embodiment of mill liner bolt 100, sealing member 118 is partially compressed by application of an initial loading. Mill liner bolt 100 is further loaded to deform deformable members 122 and achieve full clamp loading.

Accordingly, the present invention provides a mill liner bolt carrying a sealing member to provide a partially-elastic joint to maintain clamp loading and to provide an interior seal within a bore in a mill liner to prevent leaking of and racing by mill slurry liquids.

Finally, while the present invention has been described above with reference to various exemplary embodiments, many changes, combinations and modifications may be made to the exemplary embodiments without departing from the scope of the present invention. For example, the various components may be implemented in alternative ways. These alternatives can be suitably selected depending upon the particular application or in consideration of any number of factors associated with the operation of the device. In addition, the techniques described herein may be extended or modified for use with other types of devices. These and other changes or modifications are intended to be included within the scope of the present invention.

What is claimed is:

1. A mill liner bolt for use within a mill liner defining a mill liner bore, the mill liner bolt comprising:
   a mill liner bolt shank;
   an oblong mill liner bolt head extending from the mill liner bolt shank, the oblong mill liner bolt head defining opposed lateral sides configured to be non-load-bearing upon loading of the mill liner bolt, tapered load-bearing surfaces extending towards the mill liner bolt shank at opposite ends of the oblong mill liner bolt head, the tapered load-bearing surfaces configured to be load-bearing during loading of the mill liner bolt and further defining undercut surfaces extending between respective tapered surfaces and the mill liner bolt shank; and
   a compressible sealing member abutting the undercut surfaces and extending along the opposed lateral sides of the mill liner bolt head, and configured with a portion of the compressible sealing member extending beyond the adjacent respective tapered load-bearing surfaces such that compression of the portion extending beyond the adjacent respective tapered load-bearing surfaces during loading of the mill liner bolt forms a partially elastic joint adjacent a metal-to-metal joint formed with the tapered load-bearing surfaces, and causes the sealing member to be at least partially extruded beyond the opposed lateral sides to fill a clearance gap defined between the oblong mill liner bolt head and the mill liner bore.

2. The mill liner bolt of claim 1, further comprising lateral projections disposed on opposite sides of the oblong mill liner bolt head between the tapered surfaces and substantially aligned with the undercut surfaces to support the compressible sealing member during loading.

3. The mill liner bolt of claim 2, wherein the tapered load-bearing surfaces and the lateral projections are formed by forging.

4. The mill liner bolt of claim 1, in combination with the mill liner defining the bore therein; wherein the compressible sealing member is configured and positioned to reduce contact loading and thereby reduce risk of break-out of the mill liner bolt proximate a central through-hole portion of the bore in the mill liner.

5. The mill liner bolt of claim 4, wherein the compressible sealing member is configured to provide a seal between the mill liner bolt and the bore in the mill liner.

6. The mill liner bolt of claim 1, in combination with the mill liner, wherein the compressible sealing member is configured to be compressed during loading of the mill liner bolt and to absorb impacts to and vibration of the mill liner bolt during compaction of the mill liner bolt by a mill ball or ore during mill operation.

7. The mill liner bolt of claim 1, in combination with the mill liner, wherein the compressible sealing member is positioned to sealingly engage a mill liner bore surface substantially complementary to the tapered surfaces of the oblong mill liner bolt head.

8. The mill liner bolt of claim 1, further comprising a plurality of projections extending from the tapered surfaces and configured to deform during loading in contact with the mill liner.

9. The mill liner bolt of claim 1, in combination with the mill liner, wherein the sealing member is compressible during loading of the mill liner bolt so as to be at least partially extruded into a void defined between the mill liner bolt shank and a central through-hole portion of a bore defined in the mill liner.

10. The mill liner bolt of claim 1, in combination with the mill liner, wherein the sealing member is configured to reduce racing of the mill liner by forming an interior seal within the mill liner substantially preventing flow of slurry through a bore defined in the mill liner.

11. The mill liner bolt of claim 10, wherein the compressible sealing member is configured with sufficient thickness and durometer such that compression of the sealing member resists impact loosening of the mill liner bolt during compaction of the oblong mill liner bolt head by mill balls or ore contained within the mill liner during mill operation.

12. The mill liner bolt of claim 1, wherein a portion of the sealing member defines a substantial continuation of a taper profile of the respective tapered surface.

13. The mill liner bolt of claim 1, wherein the sealing member comprises an elastomeric O-ring positioned over the mill liner bolt shank and abutting the respective undercut surface.

14. The mill liner bolt of claim 1, in combination with the mill liner, wherein the sealing member is configured to provide an interior seal against escape of slurry from within the mill liner and to absorb impacts to and vibration of the mill liner bolt during mill operation.

15. A mill liner bolt comprising:
    a mill liner bolt shank;
    an oblong mill liner bolt head defining opposed tapered surfaces at opposite ends thereof and lateral surfaces extending therebetween and further defining a seal support; wherein the tapered surfaces are configured to be load-bearing during loading of the mill liner bolt and the lateral surfaces are configured to be non-load-bearing during loading of the mill liner bolt; and
    a compressible sealing member disposed about the mill liner bolt shank abutting the seal support adjacent the tapered surfaces and configured with a portion of the compressible sealing member extending beyond the adjacent respective tapered surfaces such that compression of the portion extending beyond the adjacent respective tapered surfaces during loading of the mill liner bolt causes the sealing member to be at least partially extruded beyond the on nosed lateral sides to fill a clearance gap defined between the oblong mill liner bolt head and the mill liner bore.

16. The mill liner bolt of claim 15, wherein the oblong mill liner bolt head further comprises lateral projections defining at least a portion of the seal support.

17. The mill liner bolt of claim 15, further comprising deformable ridges extending from the tapered surfaces.

18. The mill liner bolt of claim 15, in combination with a mill liner, wherein the sealing member is positioned to provide a high-pressure seal between the oblong mill liner bolt head and a complementary mill liner surface to substantially prevent racing of fastening surfaces or the mill liner.

19. A method of forming an interior seal within a mill liner fastening, the method comprising:
provviding a mill liner defining a mill liner bore therein including an oblong recess countersunk at oblong ends thereof and a central through-hole;
providing a mill liner bolt comprising a mill liner bolt shank and a mill liner bolt head extending from the mill liner bolt shank, the mill liner bolt head defining opposed lateral sides, opposed tapered load-bearing surfaces extending towards the mill liner bolt shank at opposite ends of the lateral sides, and further defining a sealing member support surface between each of the tapered load-bearing surfaces and the mill liner bolt shank;
providing a compressible sealing member abutting the sealing member support surfaces and extending along the opposed lateral sides of the mill liner bolt head, and configured with a portion of the compressible sealing member extending beyond the adjacent respective tapered load-bearing surfaces of the mill liner bolt head;
loading the mill liner bolt to compress the portion of the sealing member extending beyond the adjacent respective tapered load-bearing surfaces of the mill liner bolt head to form a partially elastic joint; and
further loading the mill liner bolt to form a metal-to-metal joint between only the tapered load-bearing surfaces of the mill liner bolt head and complementary countersunk surfaces of the mill liner bore; and
extruding the compressible sealing member beyond the opposed lateral sides to form an interior seal within the mill between the mill liner bolt head and the mill liner bore.

20. The method of claim 19, wherein the interior seal is formed by compression of the portion of the sealing member extending beyond the adjacent respective tapered load-bearing surfaces causing the sealing member to be at least partially extruded into filling a clearance gap defined between the mill liner bolt head and the mill liner bore.

21. The method of claim 19, further comprising securing an exterior sealing plate to the exterior of the mill liner with the mill liner bolt as a supplementary seal to the interior seal.

* * * * *